United States Patent [19]

Burn

[11] 3,748,812

[45] July 31, 1973

[54] MACHINE FOR COVERING A PALLET WITH SHRINKABLE PLASTIC FILM

[75] Inventor: Joseph Burn, Wyckoff, N.J.
[73] Assignee: J. & H. Co., Paterson, N.J.
[22] Filed: Oct. 26, 1971
[21] Appl. No.: 192,365

[52] U.S. Cl............................ 53/66, 53/183, 53/389
[51] Int. Cl...................... B65b 57/12, B65b 43/26
[58] Field of Search....................... 53/66, 183, 386, 53/389; 83/369; 226/172; 271/45, 75, 76

[56] References Cited
UNITED STATES PATENTS

| | | | |
|---|---|---|---|
| 3,676,980 | 7/1972 | Engelhardt et al. | 53/183 |
| 3,277,630 | 10/1966 | Youngman et al. | 53/389 |
| 2,433,035 | 12/1947 | Ersted | 226/172 X |
| 3,029,571 | 4/1962 | Douthit | 53/66 |
| 3,621,638 | 11/1971 | Grocke | 53/386 |
| 3,387,429 | 6/1968 | Peabody | 53/389 X |
| 2,719,714 | 10/1955 | Pratt et al. | 271/45 |
| 2,227,398 | 12/1940 | Mohl | 53/66 |
| 3,250,053 | 5/1966 | Hyer et al. | 53/66 |

Primary Examiner—Robert L. Spruill
Attorney—Lawrence I. Lerner et al.

[57] ABSTRACT

A loaded pallet is carried on a conveyor belt under a support frame. The support frame has motor driven rollers to which are fed double layer plastic bags open at one end. The rollers engage the end of the bag and draw it down until it is engaged by suction heads and mechanical clamps on opposite sides of the bag. The suction heads move down and pull out the sides of the bag to enclose the loaded pallet. As the open bag is moving downwardly, a sensor moving with the suction heads measures the height of the incoming or next pallet. When the suction heads reach the bottom of their travel, they will have measured the height of the incoming pallet. As the sensor moves down, a double layer plastic tube or centerfold is being fed forward from a supply roll. When the suction reaches the bottom position, the tube is cut and sealed to form a new bag. The new bag is carried by spaced tensioned belts to a position above the motor driven rollers so that the next pallet can be covered.

3 Claims, 4 Drawing Figures

INVENTOR.
Joseph Burn

INVENTOR.
Joseph Burn

MACHINE FOR COVERING A PALLET WITH SHRINKABLE PLASTIC FILM

REFERENCE TO PRIOR APPLICATION

This application is an improvement on the patent application of John B. Cimins, Ser. No. 872,592 filed Oct. 30, 1969 "Machine For Covering a Pallet Load With Shrinkable Pastic Film" assigned to J & H Company a partnership of New Jersey.

BACKGROUND OF THE INVENTION

This invention concerns a machine for covering a pallet load with a shrinkable plastic film. Other machines have been developed in the past to cover a bulk load on a pallet with a shrinkable film. It is understood that the covered loaded pallet is conveyed through an oven where the film shrinks around the load and pallet or heated within the machine itself. Thus, prior devices utilize a machine in which flat, double-layer plastic film was mechanically drawn down over a loaded pallet and automatically cut. The transparent plastic film was made of polyethyelene, polystyrene, rubber hydrochloride or other heat shrinkable material. The cutter for the double layer plastic film was positioned immediately below the rollers and thus produced a bag of uniform size, no matter what the load on the pallet so that there was waste. Additionally, since the bag had to be cut before the sheet could continue there was an additional period of time necessary to effect this cutting operation. This slowed down the operation of the machine and sometimes made it incompatable with faster conveyor systems.

SUMMARY OF THE INVENTION

The present invention eliminates these problems by providing a machine which cuts the bag in accordance with the size of the incoming pallet so that there is no waste.

Additionally, the bag for the incoming pallet is cut to size by measuring the incoming pallet as the pallet in the machine is being covered. Then, this bag is cut and fed into position by spaced tension belts so that there is no time lost for a cutting step. While the next pallet is being fitted into the machine, this next precut bag is being fed to the rollers for the next operation. The elimination of the cutting step substantially increases the speed of operation, in fact, doubling the speed of the machine.

DRAWINGS

The invention will be explained in detail in connection with the drawings wherein.

Figure 1:
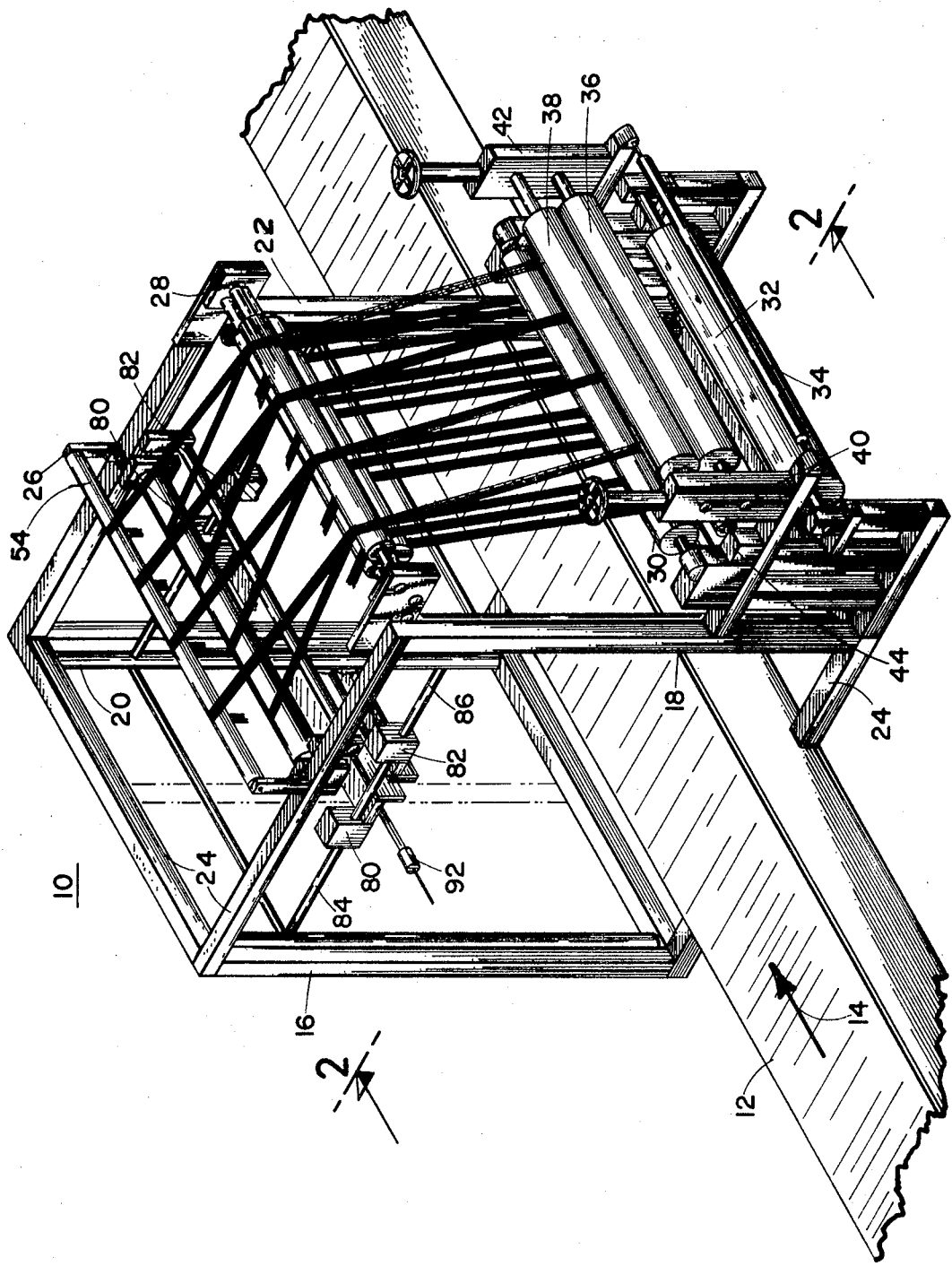
FIG. 1 is a perspective view of the machine embodying the principles of the present invention for covering a pallet load with plastic film.

Referring now to FIG. 1 there is shown a machine generally designated by the numeral 10 embodying the principles of the present invention. The machine includes a horizontal conveyor belt 12 moving in the direction of the arrow 14 on which a pallet (not shown) can be movably supported. The belt is supported on rollers (not shown), normally, such a pallet would carry a bulky load consisting of bags, boxes, packages, an automobile, a machine or other containers or articles of regular shape. The machine 10 has vertical frame members 16, 18, 20 and 22 joined at their edges by cross-members generally designated by the numeral 24. The upper cross members 24 support a first roll assembly 26 which is more fully described in FIG. 2. The roll assembly 26 is spaced centrally between parallel cross members 24. Between upright frame members 18 and 22 are placed a second set of roll members 28 which also are more fully described in FIG. 2.

Figures 2, 3:
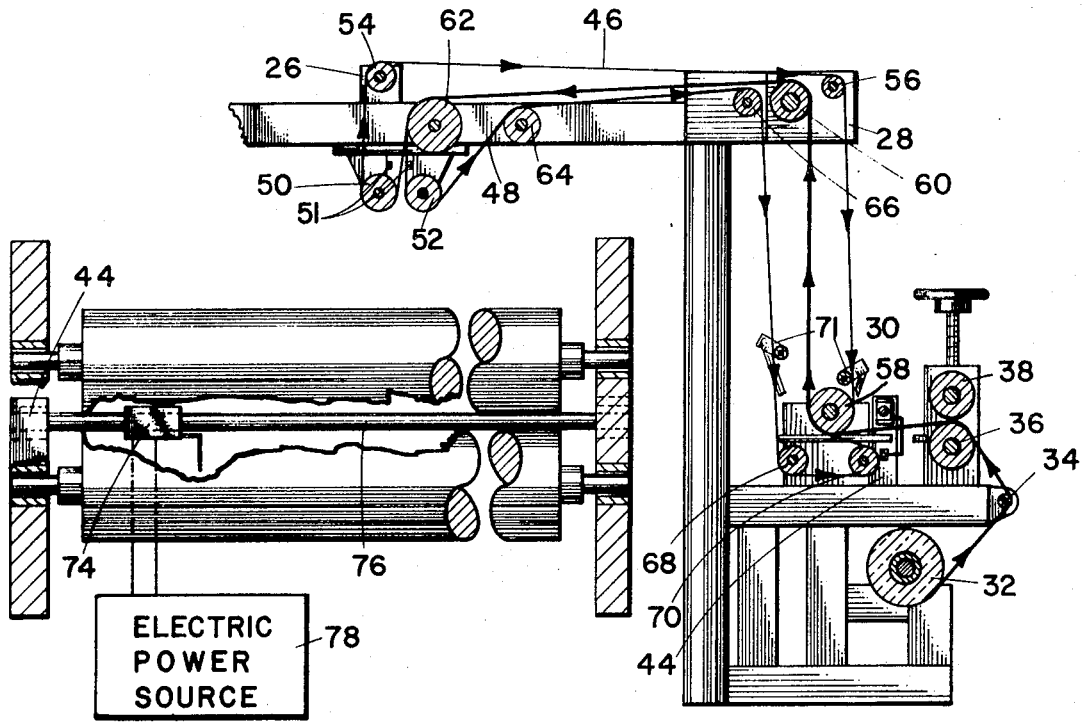
FIG. 2 is a schematic showing of the belt drive system for feeding bags to the machine of FIG. 1.
FIG. 3 is a plan view of the cut-off mechanism mounted on the machine for cutting bags.

To the side of vertical frame members 18 and 22 is a third roll assembly 30 which will also be described in the operation of FIG. 2. Below the roll assembly 30, there is placed a supply roll 32 for tubular or double layer film. Film from the supply roll 32 is fed around free running roll 34 and then through driven pinch roll 36 and 38 mounted on suitable supports 40 and 42. The tubular film is drawn through the rolls 36 and 38 and thence driven over a cutting and sealing table 44 which is best shown in operation in FIG. 3.

Referring now to FIG. 2, it should be seen that there are two sets of tensioned endless belts utilized on the machine 10. The first set of endless tensioned belts are spaced parallel belts 46. The second set of belts 48 are spaced parallel to one another across the width of the tubular film. The first belts 46, starting at one roll 50 of a pair of rolls 50 and 52 in roll assembly 26, pass around roll 54 in assembly 26 to roll 56 in assembly 28. Thence belts 46 pass around roll 58 in third assembly 30 and back over a roll 60 in second assembly 28. After passing over roll 60, belts 46 pass over roll 62 in first assembly 26 and thence back to roll 50.

Belts 48, starting from roll 52, pass over roll 64, thence over roll 66 in second assembly 28 and down to roll 68 in third assembly 30. After passing underneath roll 68, belts 48 pass under roll 70 and around on top of belts 46 on roll 58. Then, the belts 48 pass over roll 60, thence to roll 62 and finally back around roll 52.

It will be seen that the paths of belts 46 and 48 coincide from roll 58, over rolls 60 and 62 and separate as the belts pass around their respective roll 50 and 52. It will further be seen that the tubular sheet drawn between driven pinch rolls 36 and 38 is forced between the belt 46 and 48 at driven roll 58 and drawn by these belts upwardly over roll 60 and 62 to roll 50 and 52. It will further be seen that the cutter 44, cuts the tubular sheet, to form a bag. The belts 46, 48 draw a bag over roll 60 and 62 with its open end being forced down to rolls 50 and 52. It should further be noted that by maintaining tension on the belts 46 and 48 it is possible to achieve the drawing of the bag upwardly to the point of delivery through the roll 50 and 52. A sensor 51 stops the bag movement when the bag reaches a position wherein it can be grabbed by suction members 80, 82. It is extremely necessary to avoid static electricity problems with these plastic film bags and by using small spaced belts to draw the open bag, it is possible to limit any static electricity problems while still maintaining the bags fully positioned for use. Spring loaded tensioning mean for tensioning the belts are shown at 71.

The cutting means 44 is in the form of a flying knife and an electric hot wire sealer 74 mounted on a suitable guide rod 76. The electric hot wire sealer is fed from a source 78 and is movable along the guide rod 76 to the polyethylene sheet so that the bag is sealed along its trailing end and open at its forward end.

Figure 4:
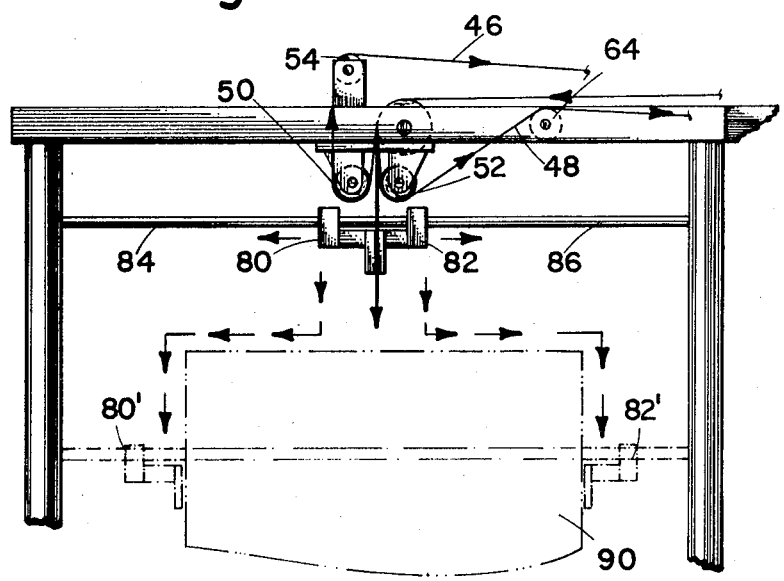
FIG. 4 is a schematic showing of the bag spreader operation of the machine of FIG. 1.

The open end of bag, after passing between the pinch rolls 50 and 52 is driven downwardly between suction grippers 80 and 82. Each of the suction members 80 and 82 is a pair mounted on suitable horizontal slide rods 84 and 86 which are contractable by pneumatic or hydraulic means so as to travel inwardly and outwardly towards one another. The rods 84 and 86 are mounted on vertical tracks for vertical movement along post 16, 18, 20 and 22. Thus, suction members 80 and 82 will follow the path 80° and 82' shown in FIG. 4. Thus, they will first open the bag pulling it apart and drawing it over a pallet load shown by the dotted line in FIG. 4 as 90. Mounted on one of the suction member 80 is a suitable sensing device 92. Sensing device 92 senses the height of the next pallet waiting to be fed by the conveyor 14. The sensing device may be a mechanical sensor as shown, or it could be a hydraulic or photoelectric sensor. As soon as sensor 92 senses the top of the incoming pallet, it initiates operation of rolls 38 and 36. Thus belts 46 and 48 start feeding a measured amount of polyethylene tubing upwardly between belts 46 and 48. When the suction members 80 and 82 reach the bottom end of their travel, a limit switch is actuated indicating that the pallet has been covered. This further stops operation of the rollers 36 and 38 and belt 46 and 48 and initiates operation of the cutter assembly 44 so as to cut a bag for the incoming pallet which will have substantially the same length as the height of the incoming pallet.

OPERATION

To operate the machine, first, the film on roll 32 is placed in position and threaded through the measuring idler 34 and pinch rolls 36 and 38 stopping at the cut off station 44.

When there is a pallet on the conveyor belt outside of the machine, in order to activate the cycle, the horizontal bars 84 and 86 on the vertical tracks open and the bag conveyor belts 46 and 48 start. The elevators in the vertical tracks start down until such time as the sensing element 92 senses a package. This starts the feeding of the film into the belt drive 46, 48.

When the elevators for the suction members 80, 82 reach the bottom of the stroke, the limit switch mentioned previously is operative stopping delivery of the film. Then, the cutting station 44 is operative. At the same time, the elevator reverses and by the time the elevators reach the top position, the cut and weld operation has ended. Then belts 46, 48 are started again and the cut bag with its open end forward is fed to the rolls 50 and 52 and stopped by switch 51.

After switch 51 is activated the cross bars 84 and 86 close to grab the incoming bag by suction members 80 and 82. At the same time, the pallet on the conveyor 14 is moved into position under the suction members 80 and 82. When the pallet is fully positioned, a switch is closed, activating the machine cycle. The suction members 80 and 82 now start to open and mechanical clamps grip the four corners to form a square opening, opening the front end of the bag and pulling it down towards the load. At the same time, sensing element 92 activates the drive rollers when it reaches the height of the next pallet. Again, when the elevator reaches the bottom of the stroke, having covered the pallet on the conveyor, a limit switch is closed which stops driving the film from the feed roll and the cut and weld operation is initiated to form another bag. The elevator reverses to return the suction members to their original position. The cutting and sealing process is completed on the next succeeding bag by the time the elevator is returned.

The belts 46 and 48 advance the now cut bag to the feed stop at the top of the elevator carriage between rows 50 and 52 to limit switch 51 to complete the cycle. It has thus been seen that there is a no time lost for cutting the bag and, further, that the bag is cut to perfect size. Additionally, the use of the spaced belts has allowed the polyfilm bag to be simply and easily transported without problems relating to static electricity.

I claim as my Invention:

1. Bulk shrink packaging apparatus comprising:
   a. a frame having load supporting means therein for supporting a load to be wrapped;
   b. sheet feeding means for feeding tubular sheet downwardly toward said load supporting means; and
   c. tube-gripping and holding means movable in opposite directions from the plane of the descending flat tubular sheet and positioned at a level above the load to be wrapped and below the sheet feeding means, said tube-gripping means being arranged to engage opposite sides of the flat tubular sheet as it is fed downwardly and spread them apart to form the sheet into a four-sides configuration and then hold it in said configuration and guide it downwardly around the load as the sheet feeding means continues to feed the sheet downwardly, and
   d. sensing means for sensing the height of the next load to be wrapped,
   e. film feeding means operable to feed a continuous length of film to said sheet feeding means in response to said sensing means sensing the height of the next load to be wrapped, and
   f. cutting means responsive to cut the film fed to the machine to a length substantially equal to the height of the next load to be wrapped,
   g. said sensing means being carried by said tube-gripping and holding means and moving along therewith, said cutting means being operative when said tube-gripping and holding means reaches its lowermost position indicating the bottom of the next load to be wrapped.

2. The bulk shrink packaging apparatus of claim 1 wherein said cutting means is operative to cut the next tubular sheet at the same time as said tube and gripping and holding means is returning to its initial position immediately below said sheet feeding means.

3. The bulk shrink film packaging apparatus of claim 1 wherein said sheet feeding means are at least two driven tension belts, said belts being positioned over common rolls to carry the tubular sheet between said tension belts over said common rolls.

* * * * *